United States Patent Office 2,910,483
Patented Oct. 27, 1959

2,910,483
PROCESS FOR THE MANUFACTURE OF TRIMETHYLENE OXIDE COMPOUNDS CONTAINING HYDROXYL GROUPS

Hermann Schnell and Karl Raichle, Krefeld-Uerdingen, and Wolfgang Biedermann, Krefeld-Bockum, Germany, assignors to Farbenfabriken Bayer Aktiengesellschaft, Leverkusen, Germany, a corporation of Germany No Drawing. Application October 13, 1955
Serial No. 540,352

25 Claims. (Cl. 260—333)

This is a continuation-in-part application to our copending application Serial No. 502,506, filed April 19, 1955, now abandoned.

The present invention relates to a new process for the manufacture of trimethylene oxide compounds containing hydroxyl groups.

It is known to convert pentaerythritol into trimethylene oxide compounds via the intermediates obtained by reacting with thionyl chloride, such as halogene-hydrins or sulphurous acid esters. These processes yield a mixture of different trimethylene oxide compounds, and they are laborious and technically disadvantageous and the yields are unsatisfactory.

The object of the present invention is to provide, in good yield and technically advantageous manner, a process for the manufacture of particularly pure trimethylene oxide compounds containing hydroxyl groups, some of which are known and some of which are not yet described in literature.

The process according to the present invention comprises reacting a polyhydroxyl compound of the general formula

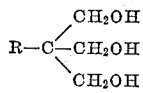

wherein R stands for the methyl, the ethyl or the hydroxymethyl group, with a carbonic acid derivative of the general formula

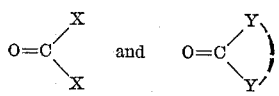

wherein X stands for a halogen atom, or an oxyalkyl, oxycycloalkyl, or oxyaryl radical. Y—Y stands for a dioxyalkyl, dioxycycloalkyl, or dioxyaryl radical. The corresponding hydroxyl compounds of these radicals should have a boiling point of at most 160° C. at 0.1 mm. Hg.

Particularly, as polyhydroxyl compounds there may be used 1,1,1-trimethylol ethane, trimethylol propane, and pentaerythritol.

As derivatives of the carbonic acid there may be used phosgene, monoesters of the chlorocarbonic acid and diesters of the carbonic acid, the radical of the hydroxyl compound of which is of the kind mentioned above. Suitable chlorocarbonic acid esters and carbonic acid diesters are for example: the methyl, the ethyl, the butyl, the amyl, the hexyl, the heptyl, the 2-ethyl-n-hexyl, the cyclopentyl, the cyclohexyl, the phenyl, the cresyl, and the tetrahydrofurfuryl ester of the chlorocarbonic acid, the dimethyl, the diethyl, the dibutyl, the diamyl, the dihexyl, the diheptyl, the di-2-ethyl-n-hexyl, the dicyclopentyl, the dicyclohexyl, the diphenyl, the dicresyl, and the ditetrahydrofurfuryl, the ethylene glycol, the 1,2-butanediol, the 1,3-butanediol, the 1,2-cyclohexanediol, and the pyrocatechinol ester of the carbonic acid.

The conversion proceeds in two stages. In the first stage, when using phosgene, hydrogen chloride, when using a carbonic acid diester, the corresponding hydroxyl compound, and when using a chlorocarbonic acid ester, both hydrogen chloride and the corresponding hydroxyl compound are split off. Carbon dioxide is then eliminated and the formation of the trimethylene oxide ring takes place with the ring closure of two adjacent original methylol groups via an oxygen atom, for example, according to the following scheme:

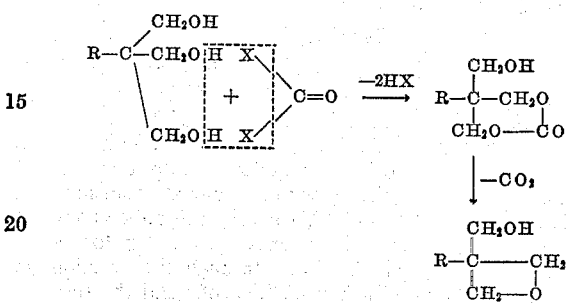

wherein R and X have the aforesaid significance.

The two reaction steps may more or less overlap.

Particularly good yields of uniform trimethylene oxide compounds are obtained by applying the stoichiometric amount of phosgene, chlorocarbonic acid ester, or carbonic acid diester required for the ring formation.

The conversion with phosgene proceeds at room temperature, but it is also possible to effect the reaction at temperature of between about −10° C. and about +100° C. When employing chlorocarbonic acid esters it is advantageous to use temperatures of between about −10° C. and about 160° C., and when using carbonic acid diesters temperatures of between about 90° C. and about 160° C.

The conversion can be carried out at normal pressure or reduced pressure. The latter is an advantage in those cases in which the boiling point of the split-off hydroxy compound lies at normal pressure above the reaction temperature.

When using phosgene it is expedient to remove the liberated hydrogen chloride from the reaction mixture as completely as possible, for example by blowing air through the reaction mixture or by boiling out.

Again when using phosgene it can be advantageous to apply a solvent in which the polyhydric alcohol dissolves at least partially and the reaction product as well as possible, for example dioxane, tetrahydrofurane or pyridine.

When using chlorocarbonic acid esters, we prefer to add at least the stoichiometric amount of a tert. amine such as pyridine, N,N-dimethyl-aniline and triethyl amine.

When using carbonic acid esters, the conversion can be expedited by adding an inorganic basic compound, for example an alkali metal hydroxide, an alkali metal carbonate or an alkali metal alcoholate so that a considerable reduction in the reaction time occurs.

The splitting-off of carbon dioxide in the second step of the conversion sets in generally at temperatures of above 120° C. and may be increased by a futher raising of the temperature. The splitting-off of carbon dioxide can also be expedited by adding the aforesaid basic compounds.

The trimethylene oxide compound, containing hydroxy groups, formed thereby, is advantageously distilled off as it is formed, at reduced pressure if desired.

The compounds produced by the process according to the invention are outstandingly suitable as solvents, for instance for high molecular weight compounds, such as nitrocellulose, polyamides, polyesters and polystyrene.

Esters of some products, for instance the 3-ethyl-3-methylol - trimethylene - oxide - benzoate, are plasticizers and/or stabilizers, for instance for polyvinyl chloride. Further the products of the invention may be polymerised, e.g. by adding an acid catalyst, such as sulphuric acid, phosphoric acid, boron trifluoride, zinc chloride, aluminum chloride and acid ion exchangers in amounts of 0.01–10 mol percents. The polymerisation products, for instance that of the 3-ethyl-3-methylol-trimethyleneoxide, are colourless, glassy, thermoplastic materials, suitable for instance for optical purposes, such as cements for optical lenses.

The following Examples are given for the purpose of illustrating the invention.

Example 1

Into a solution of 134 parts by weight of 1,1,1-trimethylolpropane in 250 parts by volume of dioxane, there is run with stirring and cooling a solution of 99 parts by weight of phosgene in 250 parts by volume of dioxane so that the temperature in the reaction mixture does not exceed 20° C. After stirring for one hour at room temperature it is heated to 80° C. whereby the bulk of the liberated hydrogen chloride escapes. In order to remove it completely, air is blown through the reaction mixture. The dioxane is then distilled off, and the residue is treated with 10 parts by weight of potassium carbonate. While stirring is continued, the mixture is heated to 160° C. at a pressure of 10–200 mm. Hg whereby carbon dioxide splits off and 3-ethyl-3-methylol-trimethylene oxide distils off slowly. 102 parts by weight of the crude product are obtained. After re-distilling, 96 parts by weight of the pure product are obtained corresponding to a yield of 86 percent of the theoretical referred to converted trimethylolpropane. 5 parts by weight of the unreacted trimethylol propane may be recovered from the residue, for example by distilling.

The 3-ethyl-3-methylol-trimethylene oxide boils at a pressure of 4 mm. Hg at 96° C.

*Analysis:*

3 - ethyl - 3 - methylol-trimethylene oxide $C_6H_{12}O_2$ (116)—
  Calculated: C, 62.0%; H, 10.4%; hydroxyl number: 483.
  Found: C, 62.1%; H, 10.6%; hydroxyl number, 478.
Phenylurethane of 3-ethyl-3-methylol-trimethylene oxide $C_{13}H_{17}O_3N$—
  Calculated: C, 66.4%; H, 7.2%; N, 6.0%.
  Found: C, 66.4%; H, 7.4%; N, 6.4%.

Example 2

Into a mixture of 120 parts by weight of 1,1,1-trimethylolethane and 250 parts by volume of dioxane, there is run with stirring at 50° C. a solution of 99 parts by weight of phosgene in 250 parts by volume of dioxane so that the temperature in the reaction mixture at the end of the addition of the phosgene solution is 60° C. The trimethylolethane is thereby completely dissolved. It is subsequently stirred for another hour and then heated to 80° C. At this temperature the bulk of the liberated hydrogen chloride escapes. In order to remove it completely, air is blown through the reaction mixture. The dioxane is then distilled off, and the residue is treated with 5 parts by weight of potassium carbonate. While stirring is continued, the mixture is heated to 160° C. at a pressure of about 200 mm. Hg whereby carbon dioxide splits off and 3-methyl-3-methylol-trimethylene oxide distils off slowly. 86.5 parts by weight of the pure product are obtained corresponding to a yield of 91 percent of the theoretical, referred to converted trimethylolethane. 8 parts by weight of the unreacted trimethylolethane may be recovered from the distillation residue, for example by recrystallizing from dioxane.

The 3-methyl-3-methylol-trimethylene oxide boils at a pressure of 1 mm. Hg at 72° C.

*Analysis:*

3 - methyl - 3-methylol-trimethylene oxide $C_5H_{10}O_2$ (102)—
  Calculated: C, 58.8%; H, 9.8%; hydroxyl number, 549.
  Found: C, 59.0%; H, 9.9%; hydroxyl number, 537.

Example 3

Into a melt of 134 parts by weight of 1,1,1-trimethylolpropane, there are introduced at 60° with stirring 140 parts by weight of gaseous phosgene at such a speed that the escaping hydrogen chloride contains as little phosgene as possible. Thereafter the mixture is heated to 120° C. and then stirred at this temperature for 3 hours whereby further hydrogen chloride escapes. It is subsequently worked up as described in Example 1. The distillation yields 71 parts by weight of 3-ethyl-3-methylol-trimethylene oxide and 19 parts by weight of unreacted trimethylolpropane.

Example 4

134 parts by weight of 1,1,1-trimethylolpropane and 118 parts by weight of diethylcarbonate are first heated with 2.5 parts by weight of potassium carbonate to 100–110° C. while stirring. At the same time, the bulk of the liberated ethanol is distilled off in a fractionating column in order to remove the unreacted diethyl carbonate. The temperature is then slowly raised to 160° C., whereby carbon dioxide is evolved and the remaining ethanol goes over. A total of 88 parts by weight of ethanol corresponding to 96 percent of the theoretical are obtained. It is further stirred at 160° C. until the evolution of carbon dioxide is complete. The 3-ethyl-3-methylol-trimethylene oxide formed is subsequently fractionated therefrom with continuous stirring at the same temperature and a pressure of 20–30 mm. Hg. 89 parts by weight of the pure 3-ethyl-3-methylol-trimethylene oxide, corresponding to 90.5 percent of the theoretical yield referred to reacted trimethylolpropane, is obtained. 20 parts by weight of the unreacted trimethylolpropane can be recovered from the residue, for example by distilling.

If the process is carried out in the same manner as described above but at reduced pressure during the splitting-off of carbon dioxide, the 3-ethyl-3-methylol-trimethylene oxide distils off from the reaction mixture as it is formed. 92 parts by weight of the product are obtained corresponding to 93.5 percent of the theoretical yield referred to unreacted trimethylolpropane.

Example 5

A mixture of 134 parts by weight of 1,1,1-trimethylolpropane and 174 parts by weight of di-n-butylcarbonate is treated with a hot solution of 0.1 part by weight of sodium in 2 parts by volume of n-butanol and heated with stirring to 145° C. As soon as the mixture is homogeneous and clear it is cooled to 110° C., and the bulk of the liberated n-butanol is distilled off in a fractionating column at reduced pressure in order to separate the unreacted di-n-butylcarbonate. The temperature is then slowly raised to 160° C. with further stirring and maintaining the reduced pressure, whereby the generation of carbon dioxide sets in and the remaining n-butanol goes over. A total of 149 parts by weight of n-butanol corresponding to 100 percent of the theoretical is obtained. The generation of carbon dioxide is then completed under the same reaction conditions whereby the 3-ethyl-3-methylol-trimethylene oxide formed is distilled off. 101 parts by weight of the pure 3-ethyl-3-methyloltrimethylene oxide are obtained corresponding to 87 percent of the theoretical yield referred to the trimethylolpropane used.

Example 6

0.1 part by weight of sodium are dissolved in a mixture of 134 parts by weight of 1,1,1-trimethylolpropane and 282 parts by weight of di-(2-ethyl-n-hexyl) carbonate and the mixture is heated to 180° C. As soon as the mixture is clear, it is cooled to 110° C., and the 2-ethylhexanol-1 formed is distilled off with stirring under water-jet vacuum. The mixture is then heated to 160° C. with stirring while maintaining the reduced pressure whereby the remaining 2-ethylhexanol-1 goes over. A total of 254 parts by weight of 2-ethylhexanol-1 corresponding to 98 percent of the theoretical is obtained. It is then further treated as described in Example 4. 94 parts by weight of the pure 3-ethyl-3-methylol-trimethylene oxide are obtained corresponding to 81 percent of the theoretical yield referred to the trimethylolpropane used.

Example 7

134 parts by weight of 1,1,1-trimethylolpropane and 224 parts by weight of dicyclohexyl carbonate are heated together with 0.5 part by weight of sodium cyclohexanolate to 100° C. with stirring under water-jet vacuum. The bulk of the liberated cyclohexanol is distilled off at the same time. Thereafter, the mixture is slowly heated to 160° C. while maintaining the reduced pressure whereby carbon dioxide is evolved and the remaining cyclohexanol goes over. A total of 197 parts by weight of cyclohexanol corresponding to 98.5 percent of the theoretical is obtained. It is then further treated as described in Example 4. 96.5 parts by weight of the pure 3-ethyl-3-methylol-trimethylene oxide are obtained corresponding to 83.2 percent of the theoretical yield referred to the trimethylolpropane used.

Example 8

The mixture of 134 parts by weight of 1,1,1-trimethylolpropane, 214 parts by weight of diphenyl carbonate and 0.5 part by weight of sodium phenolate is treated and worked up as described in Example 4. 183 parts by weight of phenol, corresponding to 97.5 percent of the theoretical, are distilled off, and the yield in 3-ethyl-3-methylol-trimethylene oxide amounts to 99 parts by weight, corresponding to 85.4 percent of the theoretical, referred to the applied trimethylolpropane.

Example 9

134 parts by weight of 1,1,1-trimethylolpropane and 95 parts by weight of ethyleneglycol carbonate are heated with stirring to 145° C. at a pressure of 70 mm. Hg. The mixture is then kept for 75 minutes at a temperature of 140–150° C. and a pressure of 30 mm. Hg and the 70 parts by weight of glycol formed is subsequently distilled off during 90 minutes at a temperature of 90° C. and a pressure of 20 mm. Hg. The remainder is then further heated to 160° C. while slowly reducing the pressure to about 2.5 mm. Hg whereby, within about 180 minutes, there are fractionated out 76 parts by weight of 3-ethyl-3-methylol-trimethylene oxide, corresponding to a yield of 80 percent of the theoretical referred to trimethylolpropane. Further amounts of 3-ethyl-3-methylol-trimethylene oxide can be obtained by re-fractionating the glycol fraction.

Example 10

136 parts by weight of pentaerythritol and 118 parts by weight of diethyl carbonate are heated together with 2 parts by weight of potassium carbonate to 130° C. while stirring. After the head of the column has reached the boiling temperature of ethanol, the supply of heat is regulated so that the bulk of the liberated ethanol distils off free from diethyl carbonate. The mixture is then slowly heated to 140° C. and the remaining ethanol is driven off in vacuo. After removing the column, the mixture is heated to 160–190° C. in vacuo and, after the first runnings of 1–2 percent of 2,6-dioxa-4-spiroheptane with the splitting off of carbon dioxide, the 3,3-dimethylol-trimethylene oxide chiefly formed distils off slowly. 82 parts by weight are obtained correponding to a yield of 70 percent of the theoretical, referred to pentaerythritol.

Example 11

0.2 part by weight of sodium are dissolved with heating in a mixture of 134 parts by weight of 1,1,1-trimethylolpropane and 136 parts by weight of pyrocatechinic carbonate. The mixture is subsequently worked up as described in Example 4, but without using a column. 102 parts by weight of pyrocatechol are recovered. 98 parts by weight of 3-ethyl-3-methylol-trimethylene oxide are obtained, corresponding to 84.5 percent of the theoretical yield, referred to applied trimethylolpropane.

Example 12

A mixture of 268 parts by weight of trimethylolpropane and 238 parts by weight of butanediol-1,3 carbonate is heated to 120° C. while stirring at a pressure of 6 mm. Hg. (The butanediol-1,3 carbonate was obtained by re-esterifying 180 parts by weight of butanediol-1,3 with 236 parts by weight of diethyl carbonate in the presence of 4 parts by weight of potassium carbonate at a temperature below 120° C.). At the same time, the liberated butanediol-1,3 (167 parts by weight) is distilled off. The temperature is then slowly raised to 160° C. Subsequently the reaction mixture is worked up as described in Example 4. 161 parts by weight of 3-ethyl-3-methylol-trimethylene oxide are obtained.

Example 13

217 parts by weight of ethyl chlorocarbonate are dropped into a mixture of 268 parts by weight of 1,1,1-trimethylolpropane and 242 parts by weight of N,N-dimethyl aniline while stirring at a temperature of 20° C. In order to complete the conversion the mixture is stirred at room-temperature for another hour and at 100° C. for further 2 hours. Then 70 parts by weight of potassium carbonate are added, whereby N,N-dimethyl aniline, water and carbon dioxide are split off, which are removed from the reaction mixture at reduced pressure while stirring at 90° C. Thereafter the temperature is slowly raised to 140° C. while maintaining the reduced pressure, whereby the bulk of the liberated ethanol is distilled off. Finally the temperature is raised to 160° C. Thereby further carbon dioxide is split off. After first runnings of the residual parts of ethanol, at a pressure of 20 mm. Hg 3-ethyl-3-methylolpropane distils off. 162 parts by weight of the raw product are obtained. By refractionating 150 parts by weight of pure 3-ethyl-3-methylol-trimethylene oxide are obtained, corresponding to 72 percent of the theoretical yield, referred to reacted trimethylolpropane. 26 parts by weight of unreacted trimethylolpropane can be recovered from the residue, for example by distilling.

If worked up as described above, but dropping into the mixture a solution of 46.5 parts by weight of sodium dissolved in 500 parts by volume of methanol with stirring at 20° C. instead of adding potassium carbonate the same yield of 3-ethyl-3-methylol-trimethylene oxide is obtained.

Example 14

To a mixture of 240 parts by weight of 1,1,1-trimethylolethane and 158 parts by weight of pyridine 189 parts by weight of methyl chlorocarbonate are added while stirring at 20° C. The mixture is subsequently worked up as described in Example 13. 139 parts by weight of 3-methyl-3-methylol-trimethylene oxide are obtained, corresponding to 68 percent of the theoretical yield, referred to the trimethylolethane applied.

Example 15

313 parts by weight of phenyl chlorocarbonate are dropped into a mixture of 268 parts by weight of 1,1,1-trimethylolpropane and 158 parts by weight of pyridine as described in Example 13. It is subsequently worked up as described there. 181 parts by weight of phenol and 163 parts by weight of 3-ethyl-3-methylol-trimethylene oxide are obtained, corresponding to 70 percent of the theoretical yield, referred to trimethylolpropane applied.

*Example 16*

In to a mixture of 136 parts by weight of finely pulverized pentaerythritol and 474 parts by weight of pyridine, there are run with stirring 108.5 parts by weight of ethyl chlorocarbonate so that the reaction mixture is rapidly heated to 80–90° C. Thereby the pentaerythritol dissolves completely. At this temperature the residue of the ethyl chlorocarbonate is added. Then it is stirred for further 2 hours at 100° C. and subsequently worked up as described in Example 13. 73 parts by weight of the raw distillate are obtained. By refractionating 68 parts by weight of pure 3,3-dimethylol-trimethylene oxide are obtained, boiling at a pressure of 0.25 mm. Hg at a temperature of 122° C.

We claim:

1. A process for the manufacture of trimethylene oxide compounds containing hydroxyl groups which comprises reacting a polyhydroxy compound of the general formula

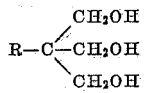

wherein R is selected from the group consisting of methyl, ethyl, and hydroxymethyl, with a carbonic acid derivative selected from the group consisting of

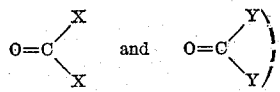

wherein X is selected from the group consisting of chlorine, oxyalkyl, oxycycloalkyl and oxyaryl radicals and Y—Y is selected from the group consisting of dioxyalkyl, dioxycycloalkyl and dioxyaryl radicals, the corresponding hydroxyl compounds of said X and Y—Y having a boiling point of at most 160° C. at 0.1 mm. Hg.

2. A process according to claim 1 wherein stoichiometric amounts of a polyhydroxyl compound and a carbonic acid derivative are applied.

3. A process according to claim 1 in which the polyhydroxyl compound is trimethylol ethane.

4. A process according to claim 1 in which the polyhydroxyl compound is trimethylolpropane.

5. A process according to claim 1 in which the polyhydroxyl compound is pentaerythritol.

6. A process according to claim 1 in which the carbonic acid derivative is phosgene.

7. A process according to claim 1 in which the carbonic acid derivative is an ester of chlorocarbonic acid.

8. A process according to claim 1 in which the carbonic acid derivative is a chlorocarbonic acid ester of phenol.

9. A process according to claim 1 in which the carbonic acid derivative is a diester of carbonic acid.

10. A process according to claim 1 in which the carbonic acid derivative is a diester of a monohydroxyaryl compound.

11. A process according to claim 1 in which the carbonic acid derivative is a diester of a dihydroxyaryl compound.

12. A process according to claim 1 wherein the reaction temperature is from about −10° C. to about +160° C.

13. A process according to claim 1 wherein the reaction is carried out at normal pressure.

14. A process according to claim 1 wherein the reaction is carried out at reduced pressure.

15. A process according to claim 1 wherein at least the stoichiometric amount of a tertiary amine selected from the group consisting of pyridine, N,N-dimethylaniline and triethyl amine is added.

16. A process according to claim 1 wherein an inorganic basic compound selected from the group consisting of sodium and potassium hydroxide, carbonate and alcoholate is added.

17. A process for the manufacture of 3-methyl-3-methylol-trimethylene oxide which comprises running with stirring at 50–60° C. a solution of 99 parts by weight of phosgene in 250 parts by volume of dioxane into a mixture of 120 parts by weight of 1,1,1-trimethylol ethane and 250 parts by volume of dioxane, heating the mixture to 80° C. blowing air through the mixture, distilling off the dioxane, adding 5 parts by weight of potassium carbonate and raising the temperature to 160° C. under reducing the pressure to about 200 mm. Hg whereby 3-methyl-3-methylol-trimethylene oxide is distilled off.

18. A process for the manufacture of 3-ethyl-3-methylol-trimethylene oxide which comprises introducing at 60° C. with stirring 140 parts by weight of gaseous phosgene into a melt of 134 parts by weight of 1,1,1-trimethylol-propane, heating the mixture to 120° C. for about 3 hours, blowing air through the mixture, adding 10 parts by weight of potassium carbonate and raising the temperature to 160° C. under reducing the pressure to 200–10 mm. Hg whereby 3-ethyl-3-methylol-trimethylene oxide is distilled off.

19. A process for the manufacture of 3-ethyl-3-methylol-trimethylene oxide which comprises heating a mixture of 134 parts by weight of 1,1,1-trimethylolpropane, 118 parts by weight of diethyl carbonate and 2.5 parts by weight of potassium carbonate to 100–110° C. while stirring, then raising the temperature to 160° C. and reducing the pressure to 30–20 mm. Hg whereby 3-ethyl-3-methylol-trimethylene oxide is distilled off.

20. A process for the manufacture of 3-ethyl-3-methylol-trimethylene oxide which comprises dropping at 20° C. while stirring 217 parts by weight of ethyl chlorocarbonate into a mixture of 268 parts by weight of 1,1,1-trimethylolpropane and 242 parts by weight of N,N-dimethyl aniline, heating the mixture to 100° C. for about 2 hours, adding 70 parts by weight of potassium carbonate and slowly raising the temperature to 140° C. under reducing the pressure to about 20 mm. Hg whereby 3-ethyl-3-methylolpropane is distilled off.

21. A process for the manufacture of 3,3-dimethylol-trimethylene oxide which comprises running with stirring at temperatures from room temperature to about 90° C. 108.5 parts by weight of ethyl chlorocarbonate into a mixture of 136 parts by weight of finely pulverized pentaerythritol and 474 parts by weight of pyridine, stirring the mixture for about 2 hours at 100° C., adding 70 parts by weight of potassium carbonate and raising the temperature to about 160° C. while stirring and reducing the pressure to 20 mm. Hg whereby 3,3-dimethylol-trimethylene oxide is distilled off.

22. 3-methyl-3-methylol-trimethylene oxide.

23. 3-ethyl-3-methylol-trimethylene oxide.

24. A process according to claim 1 wherein a reaction inert solvent selected from the group consisting of dioxane, tetrahydrofurane and pyridine is employed for the polyhydroxyl compound.

25. A process according to claim 24, wherein said solvent is selected from the group consisting of dioxane, tetrahydrofurane and pyridene.

References Cited in the file of this patent

UNITED STATES PATENTS

| | | |
|---|---|---|
| 2,462,048 | Wyler | Feb. 15, 1949 |
| 2,468,722 | Wyler | Apr. 26, 1949 |

FOREIGN PATENTS

| | | |
|---|---|---|
| 1,065,633 | France | Jan. 13, 1954 |
| 875,804 | Germany | May 7, 1953 |